US012764066B2

(12) United States Patent
Li

(10) Patent No.: US 12,764,066 B2
(45) Date of Patent: Oct. 13, 2026

(54) MESSAGE SENDING

(71) Applicant: New H3C Technologies Co., Ltd., Hangzhou (CN)

(72) Inventor: Hao Li, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 169 days.

(21) Appl. No.: 18/714,687

(22) PCT Filed: Jun. 28, 2022

(86) PCT No.: PCT/CN2022/101725
§ 371 (c)(1),
(2) Date: May 30, 2024

(87) PCT Pub. No.: WO2024/000140
PCT Pub. Date: Jan. 4, 2024

(65) Prior Publication Data
US 2025/0030634 A1 Jan. 23, 2025

(51) Int. Cl.
*H04L 45/74* (2022.01)
*H04L 69/22* (2022.01)

(52) U.S. Cl.
CPC .............. *H04L 45/74* (2013.01); *H04L 69/22* (2013.01)

(58) Field of Classification Search
CPC ....... H04L 12/46; H04L 43/10; H04L 45/037; H04L 45/34; H04L 45/50; H04L 45/74; H04L 45/76; H04L 69/22
See application file for complete search history.

(56) References Cited

U.S. PATENT DOCUMENTS 10,812,378 B2 * 10/2020 Nainar ................ H04L 12/4641
2016/0026820 A1 1/2016 Kozuka et al.
(Continued)

FOREIGN PATENT DOCUMENTS

CN 108400934 8/2018
CN 111865658 10/2020
(Continued)

OTHER PUBLICATIONS

Extended European Search Report issued in corresponding European Application No. 22948263.3, dated Jan. 17, 2025.
(Continued)

*Primary Examiner* — Gil H. Lee
(74) *Attorney, Agent, or Firm* — NORTON ROSE FULBRIGHT US LLP

(57) ABSTRACT

The present disclosure provides message sending and relates to the technical field of communications. The solutions of the present disclosure include: receiving a first service message, which comprises a destination address, a first in-situ flow detection option, a segment routing header (SRH) and an original service message, and the SRH comprises an SID list indicating a forwarding path; if the destination address is a locally configured proxy SID, sending a second service message on the forwarding path, and sending the original service message to a service function node; wherein, the second service message comprises a second in-situ flow detection option, which comprises replication flag information for indicating that the second service message is a replication message of the first service message. The in-situ flow detection can be performed on the forwarding path without affecting service chain services.

14 Claims, 4 Drawing Sheets

(56) References Cited

U.S. PATENT DOCUMENTS

| | | | | |
|---|---|---|---|---|
| 2020/0389391 | A1* | 12/2020 | Li | H04L 45/74 |
| 2021/0377173 | A1* | 12/2021 | Zhang | H04L 45/04 |
| 2022/0191138 | A1* | 6/2022 | Dong | H04L 45/302 |
| 2022/0263753 | A1* | 8/2022 | Zhang | H04L 45/50 |
| 2022/0263758 | A1* | 8/2022 | Zhang | H04L 12/12 |

FOREIGN PATENT DOCUMENTS

| | | |
|---|---|---|
| CN | 111953604 | 11/2020 |
| CN | 113079091 | 7/2021 |
| EP | 4075738 | 10/2022 |
| EP | 4131855 | 2/2023 |
| WO | WO 2021135420 | 7/2021 |
| WO | WO 2021213045 | 10/2021 |

OTHER PUBLICATIONS

Office Action issued in corresponding Chinese Application No. 202280001942.4, dated Aug. 13, 2025 (English Translation provided).

International Search Report and Written Opinion issued in Corresponding PCT Application No. PCT /CN2022/101725, dated Nov. 30, 2022 (English Translation provided).

* cited by examiner

MESSAGE SENDING

CROSS REFERENCE TO RELATED APPLICATION

The present application is a national phase application under 35 U.S.C. § 371 of International Application No. PCT/CN2022/101725, filed Jun. 28, 2022, the entire contents of which are incorporated herein by reference in their entirety.

TECHNICAL FIELD

The present disclosure relates to the technical field of communications, and in particular, to message sending.

BACKGROUND

In the Segment Routing Internet Protocol Version 6 (SRv6) network, after receiving a service message, a head node can encapsulate a Segment Routing Header (SRH) in an outer layer of the service message. An Segment List is contained in the SRH. The Segment List indicates a forwarding path of the service message in the SRv6 network, thus, nodes in the SRv6 network can forward the service message based on the forwarding path.

In order to perform in-situ flow detection on service flow, a head node can also add an in-situ flow detection option to a service message. After receiving the service message, various nodes on a forwarding path can perform in-situ flow detection on the service message based on the in-situ flow detection option, and periodically report measurement information to an analyzer, and then the analyzer can determine the network performance of the forwarding path based on the measurement information. The in-situ flow detection option can contain mark bits, for example a delay mark bit indicating whether to perform delay detection, and a loss mark bit indicating whether to perform loss detection.

Currently, an SRv6 network can be combined with a service chain function. Based on actual service requirements, some endpoint nodes in the SRv6 network can serve as Service Function Forwarder (SFF) nodes which are connected with Service Function (SF) nodes. If the type of a SFF node is End.AD or End.AS, then after receiving a service message, the SFF node needs to delete the IPV6 header, in-situ flow detection option, and SRH encapsulated in the outer layer of the service message, and send the original service message to SF. After the SF node completes processing, it forwards the processed original service message to the SFF node. The SFF node encapsulates an IPV6 header, in-situ flow detection option, and SRH for the original service message based on its static configuration information or dynamic cache, wherein, the static configuration information includes pre-configured information for encapsulating the IPV6 header and SRH, and the dynamic cache is information for encapsulating the IPV6 header and SRH learned by the SFF node based on the received message.

However, the value of the mark bit added by the head node to different service messages will change dynamically with the number of service messages received by the head node. In other words, the value of the mark bit added by the head node to each service message cannot be determined in advance. As a result, the SFF node is unable to store the in-situ flow detection option based on the static configuration information or dynamic cache, and thus unable to detect the forwarding path based on the in-situ flow detection technology.

SUMMARY

The present disclosure aims at message sending, so as to perform a detection on a forwarding path based on an in-situ flow detection technology. The specific technical solutions are as follows.

In a first aspect, an example of the present disclosure provides a method for message sending, which is applied to a network device, the method includes:

- receiving a first service message, which includes a destination address, a first in-situ flow detection option, a segment routing header (SRH) and an original service message, and the SRH includes an SID list, and the SID list indicates a forwarding path;
- if the destination address is a locally configured proxy SID, then sending a second service message on the forwarding path, and sending the original service message to a service function node;
- wherein, the second service message includes a second in-situ flow detection option, which includes replication flag information for indicating that the second service message is a replication message of the first service message.

In a possible implementation, before sending the second service message on the forwarding path, the method further includes:

- determining whether the first in-situ flow detection option includes the replication flag information;
- if the first in-situ flow detection option includes the replication flag information, sending the first service message on the forwarding path;
- if the first in-situ flow detection option does not include the replication flag information, replicating the first service message and adding the replication flag information into the in-situ flow detection option of the replicated first service message, to obtain the second service message.

In a possible implementation, before sending the first service message on the forwarding path, the method further includes:

- determining whether the destination address is a last SID in the SID list;
- if the destination address is the last SID in the SID list, discarding the first service message;
- if the destination address is not the last SID in the SID list, sending the first service message on the forwarding path.

In a possible implementation, before sending a second service message on the forwarding path, the method further includes:

- obtaining a link state of a link between the network device and the service function node;
- if the link state is inaccessible, discarding the first service message;
- if the link state is accessible, replicating the first service message and adding the replication flag information into the in-situ flow detection option of the replicated first service message, to obtain the second service message.

In a possible implementation, obtaining a link state of a link between the network device and the service function node specifically includes:

obtaining the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

In a possible implementation, the in-situ flow detection option of the second service message includes a reserved field carrying the replication flag information.

In a second aspect, an example of the present disclosure provides an apparatus for message sending, which is applied to a network device, the apparatus includes:

a receiving module to receive a first service message, which includes a destination address, a first in-situ flow detection option, a segment routing header (SRH) and an original service message, and the SRH includes an SID list, and the SID list indicates a forwarding path;

a sending module to send a second service message on the forwarding path if the destination address is a locally configured proxy SID, and send the original service message to a service function node;

wherein, the second service message includes a second in-situ flow detection option, which includes replication flag information for indicating that the second service message is a replication message of the first service message.

In a possible implementation, the apparatus further includes: a judging module and a replicating module;

the judging module is to determine whether the first in-situ flow detection option includes replication flag information;

the sending module is to send the first service message on the forwarding path if the first in-situ flow detection option includes replication flag information;

the replicating module is to: if the first in-situ flow detection option does not include replication flag information, replicate the first service message and add the replication flag information to the in-situ flow detection option of the replicated first service message, to obtain the second service message.

In a possible implementation, the apparatus further includes: a first discarding module;

the judging module is to determine whether the destination address is a last SID in the SID list;

the first discarding module is to discard the first service message if the destination address is the last SID in the SID list;

the sending module is specifically to send the first service message on the forwarding path if the destination address is not the last SID in the SID list.

In a possible implementation, the apparatus further includes: an obtaining module, a second discarding module, and a replicating module;

the obtaining module is to obtain a link state of a link between the network device and the service function node;

the second discarding module is to discard the first service message if the link state is inaccessible;

the replicating module is to: if the link state is accessible, replicate the first service message and add the replication flag information into the in-situ flow detection option of the replicated first service message, to obtain the second service message.

In a possible implementation, the obtaining module is specifically to:

obtain the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

In a possible implementation, the in-situ flow detection option of the second service message includes a reserved field carrying the replication flag information.

In a third aspect, an example of the present disclosure provides a network device comprising:

a processor;

a transceiver;

a machine-readable storage medium which stores machine executable instructions that can be executed by the processor and cause the processor to implement the following steps:

Receiving, by the transceiver, a first service message, which includes a destination address, a first in-situ flow detection option, a segment routing header (SRH) and an original service message, and the SRH includes an SID list indicating a forwarding path;

if the destination address is a locally configured proxy SID, sending a second service message on the forwarding path by means of the transceiver, and sending the original service message to a Service Function (SF) node;

wherein, the second service message includes a second in-situ flow detection option, which includes replication flag information for indicating that the second service message is a replication message of the first service message.

In a possible implementation, the machine executable instructions further cause the processor to execute the following steps:

determining whether the first in-situ flow detection option includes the replication flag information;

if the first in-situ flow detection option includes the replication flag information, sending, by the transceiver, the first service message on the forwarding path;

if the first in-situ flow detection option does not include the replication flag information, replicating the first service message and adding the replication flag information into the in-situ flow detection option of the replicated first service message, to obtain the second service message.

In a possible implementation, the machine executable instructions further cause the processor to execute the following steps:

determining whether the destination address is a last SID in the SID list;

if the destination address is the last SID in the SID list, discarding the first service message;

if the destination address is not the last SID in the SID list, sending, by the transceiver, the first service message on the forwarding path.

In a possible implementation, the machine executable instructions further cause the processor to execute the following steps:

obtaining a link state of a link between the network device and the service function node;

if the link state is inaccessible, discarding the first service message;

if the link state is accessible, replicating the first service message and adding the replication flag information into the in-situ flow detection option of the replicated first service message, to obtain the second service message.

In a possible implementation, the machine executable instructions further cause the processor to execute the following steps:

obtaining the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

In a possible implementation, the in-situ flow detection option of the second service message includes a reserved field carrying the replication flag information.

In a fourth aspect, an example of the present disclosure provides a machine-readable storage medium having stored thereon machine executable instructions that, when invoked and executed by a processor, cause the processor to execute the method described above in the first aspect.

In a fifth aspect, an example of the present disclosure provides a computer program product, which causes the processor to perform the method described above in the first aspect.

By employing the above technical solutions, after receiving a first service message carrying a first in-situ flow detection option, a network device can send a second service message with a second in-situ flow detection option containing replication flag information on a forwarding path, so that the second service message will not be forwarded to a service function node, and thus there is no need to delete the in-situ flow detection option of the second service message before re-encapsulation, which allows various network devices on the forwarding path to receive the second service message carrying the in-situ flow detection option and perform in-situ flow detection. In addition, the network device can normally send an original message to a service function node, without affecting service processing of the service function node. It can be seen that examples of the present disclosure achieve the in-situ flow detection on a forwarding path without affecting service chain services.

BRIEF DESCRIPTION OF THE ACCOMPANYING DRAWINGS

In order to more clearly illustrate the technical solutions of examples of the present disclosure and the prior art, the accompanying drawings needed in the examples and the prior art are described briefly below. Obviously, the accompanying drawings in the following description are only some examples of the present disclosure. For those of ordinary skill in the art, other examples can also be obtained according to these accompanying drawings without any creative work.

FIG. 1*a* is a schematic diagram of an in-situ flow detection network according to an example of the present disclosure;

FIG. 1*b* is a schematic diagram of another in-situ flow detection network according to an example of the present disclosure;

DETAILED DESCRIPTION

In order to make the objectives, technical solutions, and advantages of the present disclosure clearer, the present disclosure will be described in further detail below with reference to the accompanying drawings and examples. Obviously, the described examples are only some, but not all, of the examples of the present disclosure. Based on the examples in the present disclosure, all other examples obtained by those of ordinary skill in the art without creative work fall within the protection scope of the present disclosure.

For ease of understanding, the related concepts involved in examples of the present disclosure are first explained and described.

In-situ flow detection consists in using normally forwarded service flow, inserting an in-situ flow detection option in specified service flow, detecting the service flow carrying the in-situ flow detection option by means of a forwarding device, reporting the collected measurement information to an analyzer which then detects and identifies subtle anomalies in a network based on the received measurement information and precisely detects performance information such as delay and loss of each service, so that the network quality SLA is visible in real time and rapid delimitation and locating of a defect is achieved.

Figure 1A:
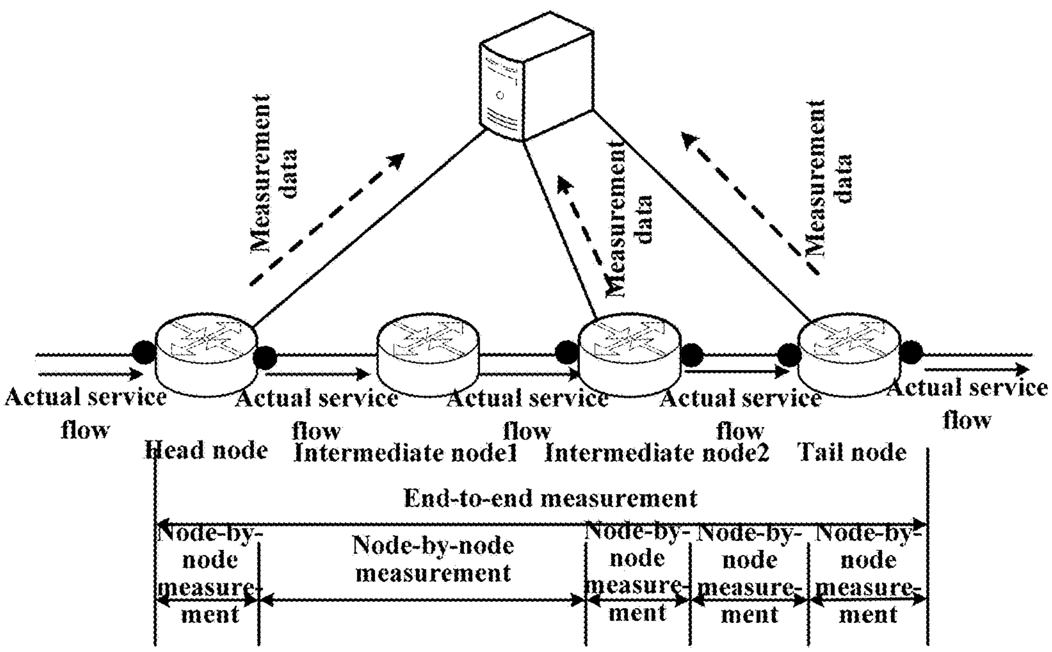

As shown in FIG. 1*a*, which is an exemplary schematic diagram of the structure of an in-situ flow detection network according to an example of the present disclosure, the in-situ flow detection network comprises a head node, a plurality of intermediate nodes, and a tail node. FIG. 1*a* shows by way of example two intermediate nodes, which are intermediate node 1 and intermediate node 2, wherein the intermediate node 1 does not support in-situ flow detection while the intermediate node 2 supports in-situ flow detection.

The head node is used for receiving an actual service flow. If it is determined that in-situ flow detection needs to be performed on the service flow, then measure data of the service flow is sent to an analyzer, an in-situ flow detection option is added to the service flow, and service flow carrying the in-situ flow detection option is forwarded to the intermediate node 1 connected with itself.

As the intermediate node 1 does not support in-situ flow detection, the service flow is directly forwarded to the intermediate node 2.

The intermediate node 2 is used for receiving a service flow. If it is identified that the service flow includes an in-situ flow detection option and the measure type indicated by the in-situ flow detection option is point-by-point measurement, then measurement data of the service flow is sent to the analyzer based on the in-situ flow detection option and the service flow is forwarded to the tail node. Or, if the measurement type indicated by the in-situ flow detection option is end-to-end measurement, then it is not necessary to send the measurement data to the analyzer, and the service flow can be forwarded to a tail node.

The tail node is used for receiving a service flow. If it is identified that the service flow includes an in-situ flow detection option, then measurement data of the service flow is sent to the analyzer based on the in-situ flow detection option, the in-situ flow detection option is deleted from the service flow, and the service flow is in turn forwarded.

The analyzer is used for receiving measurement data sent by the head node, the intermediate nodes, and the tail node, and assembling and calculating the received measurement data. For example, it can perform loss and delay calculations in order to obtain the quality of the path taken by the service flow.

For an SRv6 utilization scenario, generally, the head node of an SRv6 network serves the head node of in-situ flow detection at the same time. In-situ flow detection can be initiated by a controller or a command line on the head node. Information such as flow property, detected period, and type that needs to perform in-situ flow detection can be specified by ACL. The head node, when receiving service flow that satisfies flow properties, inserts an in-situ flow detection option in the service flow. The in-situ flow detection option can be specifically carried by an IPV6 extension header, for example, a Hop-By-Hop option extension header, or a destination option extension header.

Figure 1B:
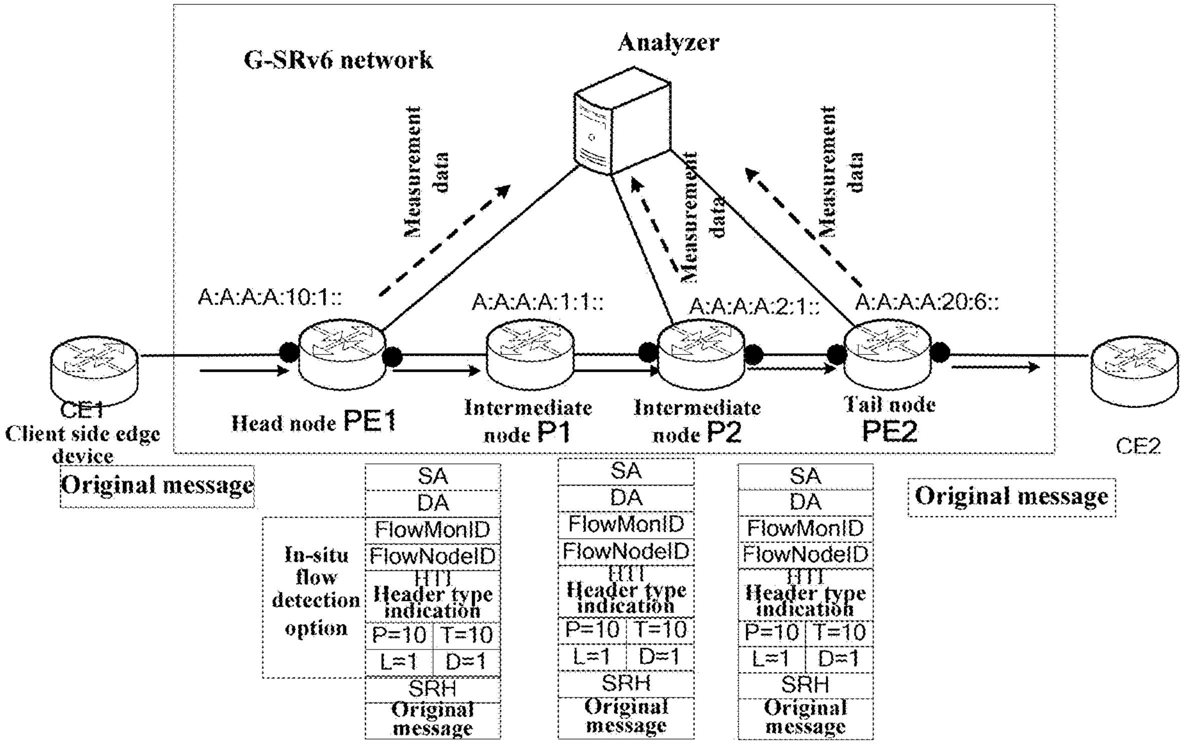

As shown in FIG. 1*b*, which is a more specific schematic diagram of an in-situ flow detection network, PE1 is a head node of an SRv6 network. After receiving an original message sent by CE1, if the original message matches a flow property that needs to perform in-situ flow detection, then an IPV6 header, an in-situ flow detection option, and an SRH header are encapsulated in an outer layer of the original message.

In reference to FIG. 1*b*, PE1 sends a message to P1, wherein, the IPv6 header includes a Source Address (SA) of 8000::1, and a Destination Address (DA) of A:A:A:A:1:1:::, i.e., the address of P1.

An in-situ flow detection option includes:

FlowMonID, which is the ID of a service flow detected.

FlowNodeID, which is the ID of the head node passed by a service flow, which can add its own node ID to this field when encapsulating an in-situ flow detection option in a service message.

Header Type Indication (HTI), which is used for indicating the carried extension data type.

P, which is a measurement period.

T, which is used for indicating the detection type, including end-to-end detection and hop-by-hop detection.

L, which is a Loss flag.

D, which is a delay flag.

The above mentioned P, T, L, and D are mark bits.

P1 does not support in-situ flow detection, therefore, after P1 receives the message, it updates the destination address of the message to A:A:A:A:2:1::, i.e., the address of P2, and forwards the message to P2.

After P2 receives the message, it can identify the in-situ flow detection option contained in the message so as to perform in-situ flow detection on the message. P2 will also update the destination address of the message to A:A:A:A:20:6::, i.e., the address of PE2, and forward the message to PE2.

After PE2 receives the message, it can identify the in-situ flow detection option contained in the message so as to perform in-situ flow detection on the message. As PE2 is the tail node, PE2 will delete the IPV6 header, the in-situ flow detection option, and the SRH from the message and then send the original message to CE2.

Wherein, when receiving and sending a message carrying an in-situ flow detection option, PE1, P2, and PE2 will count the data of the message (for example, a timestamp of receiving the message and a timestamp of sending the message) based on the in-situ flow detection option, and periodically report flow ID and measurement information to the analyzer. R1, R2, and R3 in FIG. 1*b* are processes of reporting the measurement information to the analyzer.

Figure 2:
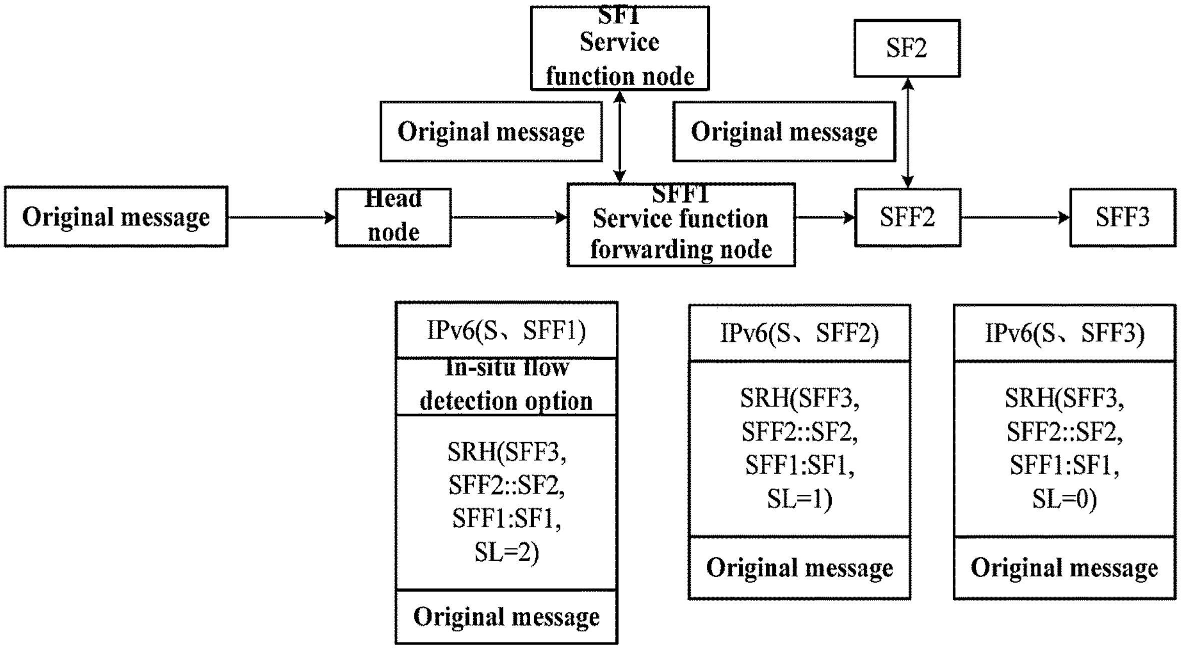
FIG. 2 is a schematic diagram of a scenario of a combination of an SRv6 network and a service chain according to an example of the present disclosure.

In an SRv6 network, in-situ flow detection can be performed on a service chain path based on the above described in-situ flow detection technology. As shown in FIG. 2, which is a schematic diagram of a scenario of combining an SRv6 network and a service chain.

Wherein, the SRv6 network in FIG. 2 can be a Generalized-SRv6 (G-SRv6) network, i.e., a compressed C-SID carried in an SRH. Or, it can be applied to a regular SRv6 network, i.e., an uncompressed C-SID carried in an SRH.

It should be noted that the service chain path in the example of the present disclosure means that in a forwarding path (which means a path indicated by a Segment ID (SID) list), a path between a SFF node and an SF node is additionally added.

For example, in FIG. 2, the forwarding path means: head node-SFF1-SFF2-SFF3; the service chain path means: head node-SFF1-SF1-SFF1-SFF2-SF2-SFF2-SFF3.

In FIG. 2, after the head node (i.e., the Classifier in the scenario of a service chain function) receives an original message (Original Packet), it encapsulates an IPv6 header, an SRH, and an in-situ flow detection option in an outer layer of the original message to obtain an encapsulated message, and then sends the encapsulated message to SFF1. After receiving the encapsulated message, SFF1 deletes the IPV6 header, the SRH, and the in-situ flow detection option to obtain the original message, and then sends the original message to SF1.

After receiving the original message processed by SF1, SFF1 needs to re-encapsulate an IPV6 header, an SRH, and an in-situ flow detection option for the processed message. However, as the in-situ flow detection option is marked flow by flow or message by message, the SFF1 node is unable to restore the in-situ flow detection option based on static configuration information or dynamic cache, which causes the SFF1 node to be able to only encapsulate an IPV6 header and an SRH for the processed original message and to send the message encapsulated with the IPV6 header and the SRH to SFF2.

Similarly, SFF2 also sends a message encapsulated with an IPV6 header and an SRH to SFF3.

In other words, in the network shown in FIG. 2, only the message received by SFF1 carries in-situ flow detection data, which causes the analyzer to be able to detect network performance of only the segment of path between the head node and SFF1 and unable to achieve end-to-end service chain path performance detection.

In addition, as the original message needs to be forwarded to the SF node, only after the SF node completes processing of the original message, the processed message will continue to be forwarded on the service chain path. However, the SF node may perform deep analysis on the original message, which takes a relatively long time that may be far longer than the time of being transmitted along a forwarding path indicated by the SID list. In addition, the SF node may also lose the original message. Therefore, performing in-situ flow detection on the message processed by the SF node is unable to reflect the actual situation of the forwarding path indicated by the SID list and to perform accurate delay detection and loss detection for the forwarding path.

Figure 3:
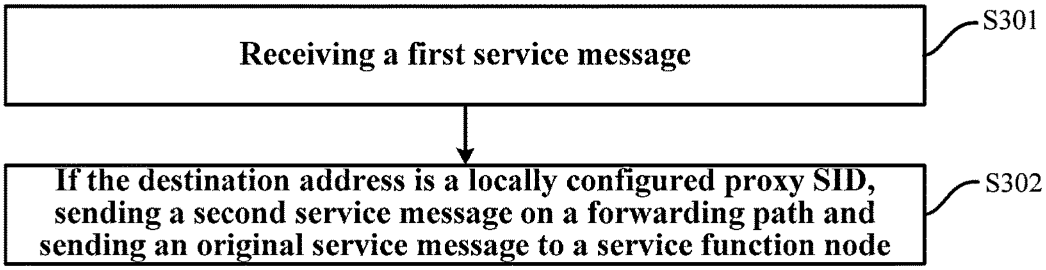
FIG. 3 is a schematic flowchart of a method for message sending according to an example of the present disclosure.

In order to solve the above-described problem, an example of the present disclosure provides a method for message sending applied to a network device. As shown in FIG. 3, the method includes the following blocks.

At S301, receiving a first service message.

Wherein, the first service message includes a destination address, a first in-situ flow detection option, a first SRH and an original service message, and the SRH includes an SID list indicating a forwarding path.

Wherein, the first service message includes an IPV6 header, and the IPV6 header includes a destination address.

At S302, if the destination address is a locally configured proxy SID, then sending a second service message on the forwarding path, and sending the original service message to an service function node.

Wherein, the second service message includes a second in-situ flow detection option, which includes replication flag information for indicating that the second service message is a replication message of the first service message.

The network device can send the second service message on the forwarding path based on the SID list, and if the destination address is a locally configured proxy SID, then it means that the network device is connected with a service function node. The network device can delete the first in-situ flow detection option, the first SRH, and the IPV6 header encapsulated in the outer layer of the first service message, to obtain the original service message, and forward the original service message to the service function node.

When the service function node sends the processed original service message to a network device, the network device re-encapsulate an SRH and an IPV6 header for the received original service message based on the local static configuration information or dynamic cache information to obtain a third service message. Then, the network device can forward the third service message based on a forwarding path indicated by the SID list. In other words, the third service message will be forwarded by the network device to a next network device on a forwarding path indicated by the SID list in the SRH. Wherein, the third service message does not contain an in-situ flow detection option.

As shown in FIG. 2, taking the scenario of FIG. 2 as an example, the network device can be SFF1 in FIG. 2. After SFF1 receives a first service message and determines that the destination address is a locally configured proxy SID (specifically, it can be End.AS SID or End.AD SID), it then sends a second service message to SFF2 and sends the original service message contained in the first service message to SF1. After receiving the processed original service message sent by SF1, SFF1 encapsulates an IPV6 header and an SRH header for the processed original service message, to obtain a third service message, and then sends the third service message to SFF2.

It can be understood that SFF2 can receive the second service message and the third service message, and after SFF2 identifies the replication flag information included in the second in-situ flow detection option of the second service message, it will not send the second service message to SF2, and instead, it will continue to forward the second service message to SFF3 on the forwarding path. In addition, as the third service message does not include an in-situ flow detection option, SFF2 can normally process the third service message.

By employing the example of the present disclosure, after the network device receives a first service message, if a destination address of the first service message is a locally configured proxy SID, the network device sends a second service message on a forwarding path, and sends the original service message to a service function node. Wherein, the in-situ flow detection option of the second service message includes replication flag information for indicating that the second service message is a replication message of the first service message. Thus, the network device sends the second service message including the second in-situ flow detection option on the forwarding path, so that the second service message will not be forwarded to a service function node, and thus there is no need to delete the in-situ flow detection option of the second service message before re-encapsulation, which allows various network devices on the forwarding path to receive the second service message carrying the in-situ flow detection option and perform in-situ flow detection. In addition, the network device can normally send an original message to a service function node, without affecting service processing of the service function node. It can be seen that example of the present disclosure achieves in-situ flow detection on a forwarding path without affecting services.

In addition, as the above-described second service message does not need to be processed by a service function node, forwarding time is saved, and the second service message is avoided to be discarded by a service function node. Since the second service message is transmitted on the forwarding path and will not be forwarded to a service function node, various nodes on the forwarding path perform in-situ flow detection based on the second service message, which can accurately reflect network performance of the forwarding path and can perform accurate delay detection and loss detection for the forwarding path.

The first in-situ flow detection option and the second in-situ flow detection option of the above described first service message both contain a reserved field. The reserved field of the second in-situ flow detection option carries replication flag information.

Figure 4:
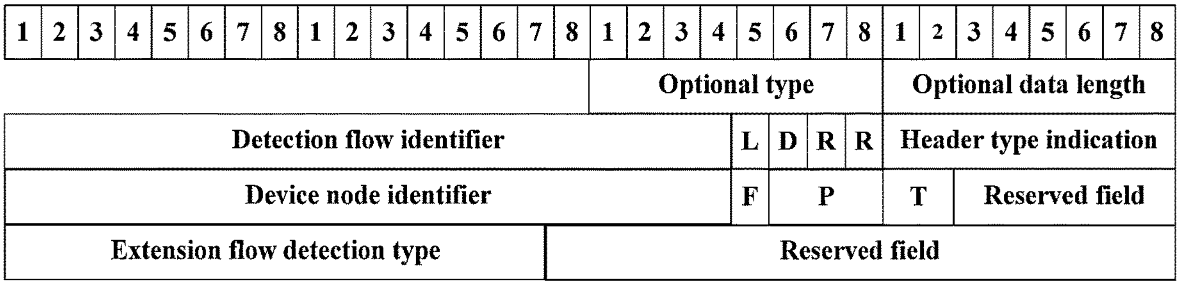
FIG. 4 is a schematic diagram of an in-situ flow detection option according to an example of the present disclosure.

As shown in FIG. 4, which is a schematic diagram of an in-situ flow detection option provided by an example of the present disclosure.

Wherein, Option Type occupies 8 bits and is the type of the in-situ flow detection option.

Opt Data Len occupies 8 bits and is the length of the in-situ flow detection option.

FlowMonID occupies 20 bits and is the ID of a service flow detected.

L occupies 1 bit and is a Loss flag.

D occupies 1 bit and is a delay flag.

R, Rsv, and Reserved are all reserved fields.

Header Type Indication (HTI) is used for indicating the type of extension data carried. When its value is 0, it indicates that there is no extension data. When its value is not 0, it indicates that extension data is carried.

NodeMonID occupies 20 bits and is a device node identifier. When a head node encapsulates an in-situ flow detection option in a service message, it can add its own node identifier in this field.

F occupies 1 bit and is a service flow direction identifier field used for carrying second indicating information. When its value is 1, it indicates that a head node on a reverse path automatically generates a service flow identification rule. When its value is 0, it indicates that the head node of a first reverse path does not generate a service flow identification rule. Wherein, the head node of the reverse path is the tail node of the forward forwarding path. Taking FIG. 1*b* as an example, the forward path is the path from PE1 to PE2, the reverse path is the path from PE2 to PE1, and PE2 in FIG. 1*b* is the tail node of the forward path and the head node of the reverse path at the same time.

P is a measurement period.

T is used for indicating the detection type, which includes end-to-end detection and hop-by-hop detection.

Ext FM Type is an extension flow detection type field and can be identified in the form of a bitmap.

In the example of the present disclosure, the replication flag information can be carried by any field of the reserved fields, such as R, Rsv, and Reserved in FIG. 4, which is not limited by examples of the present disclosure. For example, replication flag information can be carried in the R field located in the D field in FIG. 4. If the replication flag is set, i.e., its value is 1, then it indicates that the message is a replication message; if the replication Flag is not set, i.e., its value is 0, then it indicates that the message is not a replication message.

It should be noted that the first service message received by the network device may also be a replication message sent by a SFF node. Therefore, if the destination address of the first service message is a locally configured proxy SID, then the network device, before sending the second service message on the forwarding path, can determine whether the first in-situ flow detection option includes replication flag information;

if yes, i.e., the first in-situ flow detection option includes replication flag information, then the first service message is sent on the forwarding path.

If the first in-situ flow detection option includes replication flag information, then it means that the first service message is obtained by replication, and the network device does not need to replicate the first service message anymore or perform relevant service chain processing on the first service message. It can perform in-situ flow detection based on the first in-situ flow detection option and send the first service message on the forwarding path.

Taking the scenario of FIG. 2 as an example, assuming that SFF2 receives the first service message sent by SFF1, if the first in-situ flow detection option of the first service message includes replication flag information, then it means that the first service message is a service message obtained by replication after SFF1 receives a service message with an in-situ flow detection option. In this situation, SFF2 does not need to replicate again the service message, and instead, it can continue to forward the first service message along the forwarding path.

If the first in-situ flow detection option does not include replication flag information, then the first service message is replicated and replication flag information is added to the in-situ flow detection option of the replicated first service message, to obtain a second service message. Then, the above-described S302 is executed.

It can be understood that the network device obtains the second service message by replicating the first service message, and compared to the first service message, the second service message adds replication flag information to the in-situ flow detection option, and the other contents included in the second service message are the same as that in the first service message. In order to forward the second service message on the forwarding path, the network device can update the destination address in the IPV6 header of the second service message to a next SID after the SID of the network device in the forwarding path.

In addition, if the first in-situ flow detection option includes replication flag information, the network device can also determine whether the destination address is a last SID in the SID list, and if the destination address is the last SID in the SID list, the first service message is discarded, and if the destination address is not the last SID in the SID list, then the first service message is sent on the forwarding path according to the above-described method.

It can be understood that, if the destination address is a last SID in the SID list, it means that the network device receiving the first service message is the tail node of the forwarding path. As the first service message includes replication flag information, it indicates that the first service message is a service message obtained by replication for performing in-situ flow detection of the forwarding path, after the tail node receives the first service message, it means that the first service message has completed the transmission on the forwarding path, and in order to avoid affecting services, the tail node does not need to continue to send the first service message to a CE device.

By employing the example of the present disclosure, after a network device receives a first service message, it can determine whether a first in-situ flow detection option of the first service message includes replication flag information. In the case that the first service message includes replication flag information, the first service message is forwarded on the forwarding path without the need to forwarding the first service message to a service function node and thus without the need to delete the in-situ flow detection option of the first service message before re-encapsulation, so that various network devices on the forwarding path can receive the first service message carrying the in-situ flow detection option and perform in-situ flow detection for the forwarding path based on the first service message. Thus, in-situ flow detection results can accurately reflect the quality of the forwarding path.

In the case that the first service message does not include replication flag information, the network device replicates the first service message and adds replication flag information in the replicate the replicate service message, to obtain a second service message, so that when a subsequent network device on the forwarding path receives the second service message, there is no need to forward the second service message to a service function node and thus there is no need to firstly delete the in-situ flow detection option of the second service message before re-encapsulation, so that various network devices on the forwarding path can all receive the second service message carrying the in-situ flow detection option and perform the in-situ flow detection option for the forwarding path based on the second service message, which solves the problem that in-situ flow detection cannot be performed on the forwarding path and allows in-situ flow detection results to accurately reflect the quality of the forwarding path.

In another implementation of the present disclosure, in an example corresponding to FIG. 3, before the network device sends the second service message on the forwarding path, or in the case that the network device determines that the first in-situ flow detection option does not include replication flag information, then before sending the second service message on the forwarding path, the network can also obtain a link state of a link between the network device and a service function node.

if the link state is inaccessible, then the first service message is discarded;

if the link state is accessible, then the first service message is replicated, and replication flag information is added into the in-situ flow detection option of the replicated first service message, to obtain a second service message. Then, the steps of forwarding the second service message in the above described example are executed.

In an implementation, the network device can monitor in real time the link state of the link between the network device and a service function node and can record the link state in a data plane. Thus, the network device can obtain the link state of the link between the network device and a service function node from a data plane.

Wherein, if the service function node fails and/or the link between the network device and the service function node fails, the link state is inaccessible;

if the service function node does not fail and the link between the network device and the service function node does not fail, the link state is accessible.

The network device can determine whether a link between the network device and a service function node fails based on an interface state of an interface locally connected with the service function node. When the interface state is abnormal, it is determined that the link between the network device and the service function node fails; when the interface state is normal, it is determined that the link between the network device and the service function node does not fail. The network device can also determine the state of a link between the network device and a service function node by means of other methods in the prevent art, which is not limited by examples of the present disclosure.

In another implementation, if the network device determines that a service function node fails and/or a link between the network device and the service function node fails, then the forwarding switch between the network device and the service function node is set to be closed; if the service function node does not fail and the link between the network device and the service function node does not fail, then the forwarding switch between the network device and the service function node is set to be opened.

Further, if the network device determines that the forwarding switch is in an open state, then it is determined that the link state is accessible; if the network device determines that the forwarding switch is in a closed state, then it is determined that the link state is inaccessible.

It can be understood that, in the case that the first message is discarded, the analyzer is unable to receive in-situ flow detection data reported based on the first service message by other network devices after the network device on the forwarding path, and thus it can be determined that the service chain path of the first service message fails. In other words, in-situ flow detection results of the analyzer can also reflect a defect of a link between the network device and a service function node. Thus, the analyzer timely triggers the head node to timely switch service chain paths so as to avoid affecting a service chain function for a long period of time.

Optionally, whether the first service message needs to be discarded in the event that it is determined that the link state is inaccessible, can also be determined by instructing the network device by settings based on actual needs. For example, if there is no need to detect whether a link between the network device and a service function node fails by in-situ flow detection technology, then even if the state of the link between the network device and the SF mode is determined by the network device to be inaccessible, the network device still does not need to discard the first service message, and instead, can replicate the first service message and send the second service message on the forwarding path. Thus, in-situ flow detection of a subsequent forwarding path can be realized. In this situation, the head node can detect whether the state of a link between the network device and a service function node is accessible by another mode of detection in relevant art, which is not limited by examples of the present disclosure.

By employing the example of the present disclosure, the network device obtains a link state of a link between the network device and a service function node, determines whether the first service message needs to be discarded based on whether the link state is accessible, and if it is inaccessible, then the network device replicates the first service message, and generates a second service message, and transmits the second service message on the forwarding path, thus allowing in-situ flow detection of the forwarding path; if it is inaccessible, then the network device discards the first service message, so that the analyzer can timely discover that the service chain path fails, thus triggering the head node to timely switch service chain paths, avoiding affecting a service chain function for a long period of time.

Figure 5:
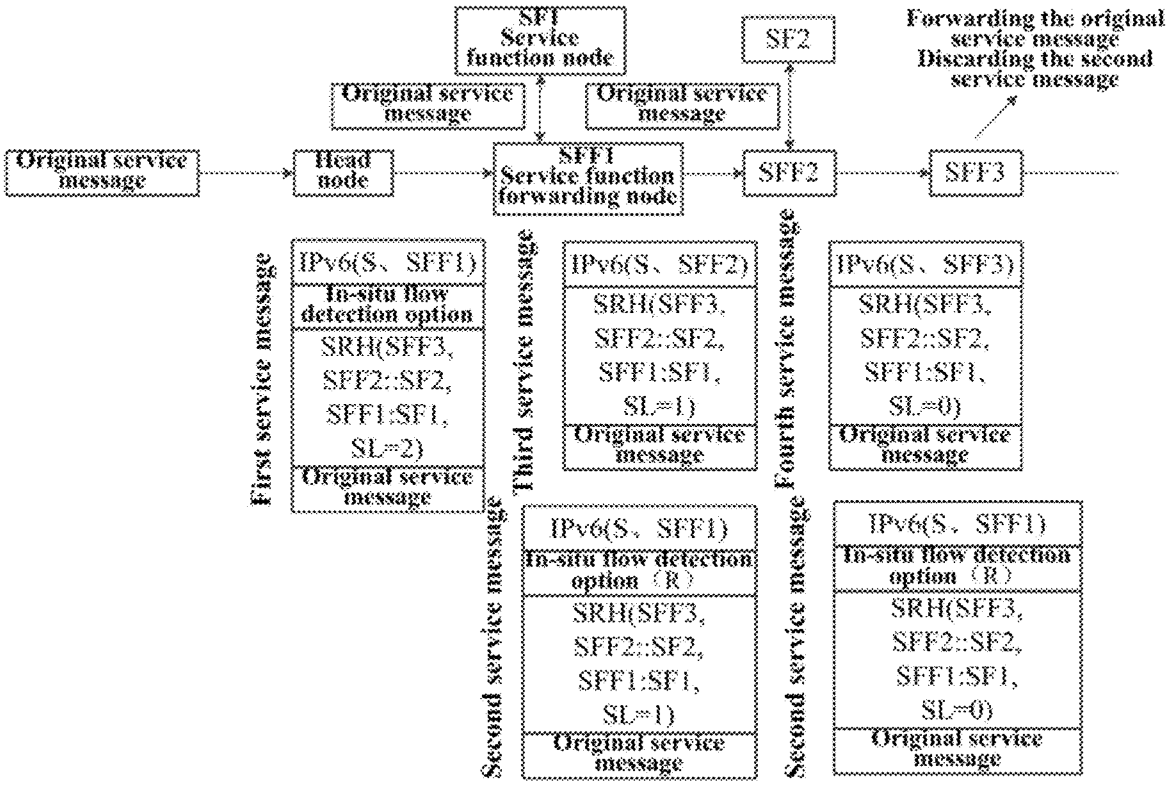
FIG. 5 is an exemplary schematic diagram of a method for message sending according to an example of the present disclosure.

Below, a method for message sending provided by an example of the present disclosure is described in connection with a specific scenario. As shown in FIG. 5, after a head node receives an original service message, it encapsulates an IPV6 header, an in-situ flow detection option, and an SRH in an outer layer of the original service message, to obtain a first service message, and sends the first service message to SFF1.

In reference to FIG. 5, the destination address of the IPV6 header of the first service message is SFF1, and the Segment List included in the SRH is SFF1::SF1, SFF2::SF2, SFF3.

Wherein, SFF1::SF1 is the SID of SFF1, its type can be End.AD or End. AS, and it is used for instructing SFF1 to send a message to SF1;

SFF2::SF2 is the SID of SFF2, its type can be End.AD or End. AS, and it is used for instructing SFF2 to send a message to SF2;

SFF3 is the SID of SFF3, and its type can be a regular End type.

After receiving a first service message, SFF1 replicates the first service message, to obtain a second service message, adds replication flag information in the in-situ flow detection option of the second service message, and then sends the second service message on the forwarding path and sends the original service message to SF1.

After SFF1 receives the processed original service message sent by SF1, it encapsulates an SRH and an IPv6 header for the processed original service message, to obtain a third service message, and sends the third service message to SFF2.

It can be seen in FIG. 5 that SFF2 can receive the second service message and the third service message.

SFF2 identifies that the in-situ flow detection option included in the second service includes replication flag information, and then performs in-situ flow detection based on the in-situ flow detection option and forwards the second service message to SFF3.

SFF2 can send the original service message in the third service message to SF2, and after receiving the original service message processed by SF2, it encapsulates an IPV6 header and an SRH header for the processed original service message, to obtain a fourth service message, and forwards the fourth service message to SFF3.

SFF3 can receive the second service message and the fourth service message. As SFF3 is the tail node, SFF3 can send the original service message included in the fourth service message to a subsequent device (for example, a CE device) and discard the second service message.

Optionally, the type of the SID of SFF1 and SFF3 can also be an End.AM type. In this situation, SFF1 and SFF2 still send the second service message on the forwarding path according to the above-described method and process the first service message according to the processing mode of an End.AM type node. SFF1 can update the destination address of the first service message to a segment with SL=0, and then delete the in-situ flow detection option in the first service message and send the processed first service message to SF1. After SFF1 receives a service message returned by SF1, it can continue to forward the message based on a mode specified by a protocol. Thus, no service function node will receive a service message carrying an in-situ flow detection option, and the demands on service function nodes will not be increased.

Figure 6:
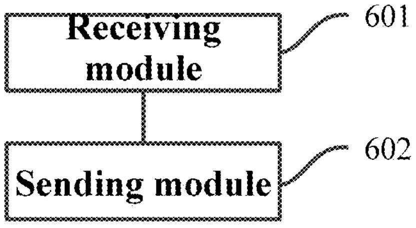
FIG. 6 is a schematic diagram of the structure of an apparatus for message sending according to an example of the present disclosure.

Based on the same inventive idea, an example of the present disclosure further provides an apparatus for message sending applied to a network device. As shown in FIG. 6, the apparatus includes:

a receiving module 601 to receive a first service message including a destination address, a first in-situ flow detection option, a segment routing header (SRH) and an original service message, and the SRH includes an SID list indicating a forwarding path;

a sending module 602 to send, if the destination address is a locally configured proxy SID, a second service message on the forwarding path, and send the original service message to a Service Function (SF) node;

wherein, the second service message includes a second in-situ flow detection option, which includes replication flag information for indicating that the second service message is a replication message of the first service message.

Optionally, the apparatus further comprises: a judging module and a replicating module;

the judging module is to determine whether the first in-situ flow detection option includes replication flag information;

the sending module 602 is to send the first service message on the forwarding path if the first in-situ flow detection option includes replication flag information;

the replicating module is to: if the first in-situ flow detection option does not include replication flag information, replicate the first service message and add the replication flag information to the in-situ flow detection option of the replicated first service message, to obtain the second service message.

Optionally, the apparatus further comprises: a first discarding module;

the judging module is further to determine whether the destination address is a last SID in the SID list;

the first discarding module is to discard the first service message if the destination address is the last SID in the SID list;

the sending module 602 is specifically to send the first service message on the forwarding path if the destination address is not the last SID in the SID list.

Optionally, the apparatus further comprises: an obtaining module, a second discarding module, and a replicating module;

the obtaining module is to obtain a link state of a link between the network device and the service function node;

the second discarding module is to: if the link state is inaccessible, discard the first service message;

the replicating module is to: if the link state is accessible, replicate the first service message and add the replication flag information into the in-situ flow detection option of the replicated first service message, to obtain the second service message.

Optionally, the obtaining module is specifically to:

obtain the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

Optionally, the in-situ flow detection option of the second service message includes a reserved field carrying the replication flag information.

Figure 7:
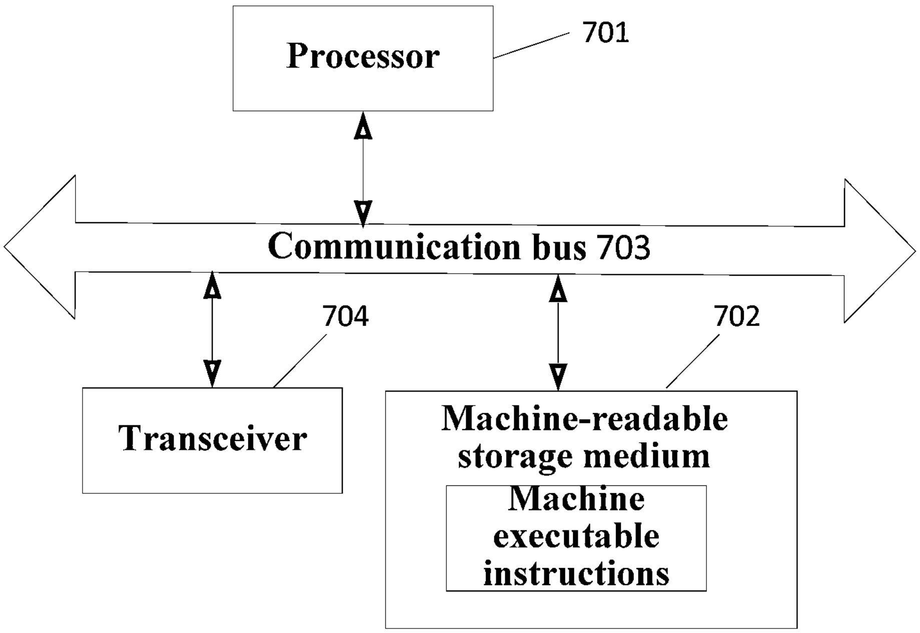
FIG. 7 is a schematic structural diagram of a network device according to an example of the present disclosure.

Another example of the present disclosure further provides a network device. As shown in FIG. 7, the network device comprises: a processor 701; a transceiver 704; a machine-readable storage medium 702 which stores machine executable instructions that can be executed by the processor 701 and cause the processor 701 to implement the following steps:

receiving, by the transceiver 704, a first service message, which includes a destination address, a first in-situ flow detection option, a segment routing header (SRH) and an original service message, wherein the SRH comprises an SID list indicating a forwarding path;

if the destination address is a locally configured proxy SID, sending, by the transceiver 704, a second service message on the forwarding path, and sending the original service message to a service function node;

wherein, the second service message includes a second in-situ flow detection option, which includes replication flag information for indicating that the second service message is a replication message of the first service message.

Optionally, the machine executable instructions further cause the processor 701 to execute the following steps:

determining whether the first in-situ flow detection option includes the replication flag information;

if the first in-situ flow detection option includes the replication flag information, sending, by the transceiver 704, the first service message on the forwarding path;

if the first in-situ flow detection option does not include the replication flag information, replicating the first service message and adding the replication flag information into the in-situ flow detection option of the replicated first service message, to obtain the second service message.

Optionally, the machine executable instructions further cause the processor 701 to execute the following steps:

determining whether the destination address is a last SID in the SID list;

if the destination address is the last SID in the SID list, discarding the first service message;

if the destination address is not the last SID in the SID list, sending, by the transceiver 704, the first service message on the forwarding path.

Optionally, the machine executable instructions further cause the processor 701 to execute the following steps:

obtaining a link state of a link between the network device and the service function node;

if the link state is inaccessible, discarding the first service message;

if the link state is accessible, replicating the first service message and adding the replication flag information into the in-situ flow detection option of the replicated first service message, to obtain the second service message.

Optionally, the machine executable instructions further cause the processor 701 to execute the following steps:

obtaining the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

Optionally, the in-situ flow detection option of the second service message includes a reserved field carrying the replication flag information.

As shown in FIG. 7, the network device can further include a communication bus 703. The processor 701, the machine-readable storage medium 702, and the transceiver 704 communicate with each other via the communication bus 703. The communication bus 703 may be a Peripheral Component Interconnect (PCI) bus or an Extended Industry Standard Architecture (EISA) bus, etc. The communication bus 703 can be divided into an address bus, a data bus, a control bus, etc.

The transceiver 704 can be a wireless communication module and can exchange data with other devices under the control of the processor 701.

The machine-readable storage medium 702 may include Random Access Memory (RAM), and may also include Non-Volatile Memory (NVM), such as at least one disk storage. Additionally, the machine-readable storage medium 702 may also be at least one storage device located remotely from the above-mentioned processor.

The processor 701 may be a general-purpose processor, including a Central Processing Unit (CPU), a Network Processor (NP), etc.; it may also be a Digital Signal Processing (DSP), an Application Specific Integrated Circuit (ASIC), a Field-Programmable Gate Array (FPGA), or other programmable logic devices, discrete gate or transistor logic devices, discrete hardware components.

Based on the same inventive idea, based on the method for message sending provided by the above described examples of the present disclosure, an example of the present disclosure further provides a machine-readable storage medium which stores machine executable instructions that can be executed by the processor and cause the processor to implement the steps of any of the method for message sending described above.

In another example provided by the present disclosure, a computer program product including instructions is also provided, which, when running on a computer, causes the computer to execute the method for message sending of any one of the above described examples.

It should be noted that relational terms herein, such as "first" and "second," are used only to distinguish one entity or operation from another entity or operation, and do not necessarily require or imply that any such actual relationship or order exists between these entities or operations. Moreover, the terms "comprising," "comprise," or any other variation thereof are intended to encompass non-exclusive inclusion such that a process, method, article or device comprising a list of elements includes not only those elements, but also includes other elements not explicitly listed or inherent to such a process, method, article or apparatus. Without further limitation, an element qualified by the phrase "include(s) a" does not preclude the presence of additional identical elements in a process, method, article or apparatus that includes the element.

The description is made only for preferred examples of the present disclosure, which are not intended to limit the present disclosure. Any modifications, equivalent replacements, improvements, etc. made within the spirit and principles of the present disclosure shall be included in the scope of protection of the present disclosure.

The invention claimed is:

1. A method for message sending, which is applied to a network device, comprising:

receiving a first service message, which comprises a destination address, a first in-situ flow detection option, a segment routing header (SRH) and an original service message, wherein the SRH comprises a Segment ID (SID) list indicating a forwarding path, the first in-situ flow detection option is used to determine whether the first service message is sent on the forwarding path, or is replicated to obtain a second service message;

if the destination address is a locally configured proxy SID, sending the second service message on the forwarding path and sending the original service message to a Service Function (SF) node;

wherein, the second service message comprises a second in-situ flow detection option, which comprises replication flag information for indicating that the second service message is a replication message of the first service message.

2. The method of claim 1, wherein before sending the second service message on the forwarding path, the method further comprises:

determining whether the first in-situ flow detection option comprises the replication flag information;

if the first in-situ flow detection option comprises the replication flag information, sending the first service message on the forwarding path;

if the first in-situ flow detection option does not comprise the replication flag information, replicating the first service message and adding the replication flag information into the in-situ flow detection option of the replicated first service message, to obtain the second service message.

3. The method of claim 2, wherein before sending the first service message on the forwarding path, the method further comprises:

determining whether the destination address is a last SID in the SID list;

if the destination address is the last SID in the SID list, discarding the first service message;

if the destination address is not the last SID in the SID list, sending the first service message on the forwarding path.

4. The method of claim 1, wherein before sending the second service message on the forwarding path, the method further comprises:

obtaining a link state of a link between the network device and the service function node;

if the link state is inaccessible, discarding the first service message;

if the link state is accessible, replicating the first service message and adding the replication flag information into the in-situ flow detection option of the replicated first service message, to obtain the second service message.

5. The method of claim 4, wherein the obtaining the link state of the link between the network device and the service function node, specifically comprises:

obtaining the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

6. The method of claim 1, wherein the in-situ flow detection option of the second service message comprises a reserved field carrying the replication flag information.

7. A non-transitory, machine-readable storage medium having stored thereon machine executable instructions that, when invoked and executed by a processor, cause the processor to implement the method of claim 1.

8. A non-transitory computer program product, which causes a processor to implement the method of claim 1.

9. A network device, comprising:

a processor;

a transceiver;

a machine-readable storage medium storing machine executable instructions that can be executed by the processor and cause the processor to implement the following steps:

receiving, by the transceiver, a first service message, which comprises a destination address, a first in-situ flow detection option, a segment routing header (SRH) and an original service message, wherein the SRH comprises an SID list indicating a forwarding path, the first in-situ flow detection option is used to determine whether the first service message is sent on the forwarding path, or is replicated to obtain a second service message;

if the destination address is a locally configured proxy SID, sending, by the transceiver, the second service message on the forwarding path and the original service message to a service function node;

wherein, the second service message comprises a second in-situ flow detection option, which comprises replication flag information for indicating that the second service message is a replication message of the first service message.

10. The network device of claim 9, wherein the machine executable instructions further cause the processor to execute the following steps:

determining whether the first in-situ flow detection option comprises the replication flag information;

if the first in-situ flow detection option comprises the replication flag information, sending, by the transceiver, the first service message on the forwarding path;

if the first in-situ flow detection option does not comprise the replication flag information, replicating the first service message and adding the replication flag information into the in-situ flow detection option of the replicated first service message, to obtain the second service message.

11. The network device of claim 10, wherein the machine executable instructions further cause the processor to execute the following steps:

determining whether the destination address is a last SID in the SID list;

if the destination address is the last SID in the SID list, discarding the first service message;

if the destination address is not the last SID in the SID list, sending, by the transceiver, the first service message on the forwarding path.

12. The network device of claim 9, wherein the machine executable instructions further cause the processor to execute the following steps:

obtaining a link state of a link between the network device and the service function node;

if the link state is inaccessible, discarding the first service message;

if the link state is accessible, replicating the first service message and adding the replication flag information into the in-situ flow detection option of the replicated first service message, to obtain the second service message.

13. The network device of claim 12, wherein the machine executable instructions further cause the processor to execute the following steps:

obtaining the link state of the link between the network device and the service function node from a data plane;

wherein, if the service function node fails and/or the link between the network device and the service function node fails, the link state is inaccessible;

if the service function node does not fail and the link between the network device and the service function node does not fail, the link state is accessible.

14. The network device of claim 9, wherein the in-situ flow detection option of the second service message comprises a reserved field carrying the replication flag information.

* * * * *